(12) United States Patent
Lee et al.

(10) Patent No.: US 11,930,234 B2
(45) Date of Patent: Mar. 12, 2024

(54) METHOD FOR PROVIDING SUBSCRIPTION SERVICE, SYSTEM, USER DEVICE, AND APPLICATION IMPLEMENTING THE METHOD

(71) Applicant: KAKAO CORP., Jeju-si (KR)

(72) Inventors: Seunghyung Lee, Seongnam-si (KR); Dasul Oh, Seongnam-si (KR); Eunju Oh, Seongnam-si (KR); Samki Lee, Seongnam-si (KR); Soo Yeun Jang, Seongnam-si (KR)

(73) Assignee: KAKAO CORP, Jeju-si (KR)

( * ) Notice: Subject to any disclaimer, the term of this patent is extended or adjusted under 35 U.S.C. 154(b) by 0 days.

(21) Appl. No.: 17/875,587

(22) Filed: Jul. 28, 2022

(65) Prior Publication Data

US 2023/0034928 A1 Feb. 2, 2023

(30) Foreign Application Priority Data

Jul. 30, 2021 (KR) .................. 10-2021-0100719

(51) Int. Cl.
*H04N 21/2668* (2011.01)
*G06F 3/0483* (2013.01)
(Continued)

(52) U.S. Cl.
CPC ....... *H04N 21/2668* (2013.01); *G06F 3/0483* (2013.01); *H04N 21/44222* (2013.01); *H04N 21/8586* (2013.01)

(58) Field of Classification Search
CPC .... G06F 3/0481; G06F 3/0482; G06F 3/0483; G06F 3/0484; G06F 3/0486;
(Continued)

(56) References Cited

U.S. PATENT DOCUMENTS 10,628,392 B1 * 4/2020 Charytoniuk ........... G06F 16/21
10,684,738 B1 * 6/2020 Sicora ................... G06F 16/435
(Continued)

FOREIGN PATENT DOCUMENTS

JP 2009-512023 3/2009
JP 2013-235542 11/2013
(Continued)

OTHER PUBLICATIONS

Yonhap News, "Kakao will launch a subscription-type content platform . . . at a glance, news, video, etc", news article, Seoul, Jun. 17, 2021.
(Continued)

*Primary Examiner* — Daniel Samwel
(74) *Attorney, Agent, or Firm* — LEX IP MEISTER, PLLC

(57) ABSTRACT

A method for providing a subscription service in a terminal installed with an instant messaging application by interworking with an application server is provided. The method comprises displaying recommendation boards recommended by the application server or boards published in a subscription channel on an interface screen, receiving a request for subscribing to a specific channel that has published the recommendation board, from a user, and transmitting information on a channel for which a subscription is requested to the application server and requesting registering as a subscription channel. Each board displayed on the interface screen is a content distribution unit that is composed of a board title and a plurality of contents, and is exposed along with a name of a channel having published a corresponding board. The channel publishing each board is an account that has subscribed to a service providing the instant messaging application.

18 Claims, 12 Drawing Sheets

(51) Int. Cl.
*H04N 21/442* (2011.01)
*H04N 21/858* (2011.01)

(58) Field of Classification Search
CPC .............. G06F 3/0488; H04N 21/2668; H04N 21/44222; H04N 21/8586
See application file for complete search history.

(56) References Cited

U.S. PATENT DOCUMENTS

| | | | |
|---|---|---|---|
| 10,769,678 | B2 | 9/2020 | Li |
| 11,144,854 | B1* | 10/2021 | Mouawad .......... G06Q 10/0639 |
| 2013/0014279 | A1* | 1/2013 | Leland ................ G06F 21/6245 |
| | | | 726/28 |
| 2018/0027298 | A1* | 1/2018 | Paglia ................ H04N 21/2668 |
| | | | 725/37 |
| 2020/0042837 | A1* | 2/2020 | Skinner ................ G06F 18/217 |
| 2022/0051169 | A1* | 2/2022 | Butterfield ..... G06Q 10/063114 |

FOREIGN PATENT DOCUMENTS

| | | |
|---|---|---|
| JP | 2016-522918 | 8/2016 |
| JP | 2018-77889 | 5/2018 |
| JP | 2020-129380 | 8/2020 |
| KR | 10-0961437 | 6/2010 |
| KR | 10-1501341 | 3/2015 |
| KR | 10-1538181 | 7/2015 |
| KR | 10-2015-0103179 | 9/2015 |
| KR | 10-1712570 | 3/2017 |
| KR | 10-1967696 | 4/2019 |

OTHER PUBLICATIONS

"Recommended videos", https://web.archive.org/web/20210123223739/https://www.youtube.com/intl/ALL_jp/howyoutubeworks/product-features/recommendations/, Aug. 9, 2023.

"How to use ""Gnosy,"" an app that allows you to collect and read your favorite news in 3 minutes", https://gigazine.net/news/20140423-gunosy/, Apr. 23, 2014 08:59 PM Advertising.

"ICP Tutorial: Try using ICP from the 2nd CODH site (IIIF Curation Viewer)", https://web.archive.org/web/20210415171557/http://ch-suzuki.com/icpt/02.html, Apr. 15, 2021.

"Explain how to edit using YouTube video editor in an easy-to-understand way", https://web.archive.org/web/20210613084150/https://www.somethingfun.co.jp/video_tips/youtube_editor, Feb. 14, 2020.

* cited by examiner

Board publication                                                                 X Disclosure settings   ⦿ Disclosed   ○ Closed Publication time   ⦿ Present   ○ Scheduled Category (optional)   (#Real-time news) (#Health) (#Economy) (#Brand) (#Career) (#Hobby) (#Knowledge culture)
(#Essay) (#Sports) (#Culture/Arts) (#Fashion/Beauty) (#Living) (#Food) (#Entertainment)
(#IT/TECH) (#Animal/Plant) (#Esthetic) (#Brand) (#Child care) (#Travel) (#Lecture)
(#Product review) (#Living information) (#Shopping) (#Issue and attention) (#Content curator)
(#Good influence) (#Life story)

⊘ Expose reward notification message on board.

☐ Publish

METHOD FOR PROVIDING SUBSCRIPTION SERVICE, SYSTEM, USER DEVICE, AND APPLICATION IMPLEMENTING THE METHOD

CROSS-REFERENCE TO RELATED APPLICATION

This application claims priority to and the benefit of Korean Patent Application No. 10-2021-0100719 filed in the Korean Intellectual Property Office on Jul. 30, 2021, the entire contents of which are incorporated herein by reference.

BACKGROUND

(a) Field

The present disclosure is related to a content subscription.

(b) Description of the Related Art

Recently, subscription services have been launched in various fields. Particularly, content services, such as an OTT service, a music streaming service, a webtoon service, and a digital book service, are recognized as representative fields of a subscription economy.

Conventionally, the contents were consumed in a way that a content provider recommends customized contents to a user by analyzing user interests, and then the user consumes the recommended contents. Recently, the manner of content consumption has been changed in a way that the user subscribes to contents corresponding to one's interests and consumes the subscribed contents. To meet such a change in content consumption, a new subscription platform that can provide convenience in creating and publishing a content and can facilitate a subscription is required.

SUMMARY

An embodiment provides a method for providing a subscription service, and to provide a subscription system, a user terminal and an application implementing the same.

An embodiment is related to a method for providing a subscription service that supports publishing a board composed of contents curated by a creator and subscribing to a channel where the board is published.

An embodiment provides an editor that enables a creator to load a created content and a collected content into a board, being a content distribution unit, and enables to publish and manage the board.

An embodiment provides an interface screen that can expose a board published in a channel, recommend a board, or support subscription to a channel where a board is published.

According to an embodiment, a method for providing a subscription service by a terminal installed with an instant messaging application, through interworking with an application server is provided. The method includes displaying recommendation boards recommended by the application server or boards published in a subscription channel on an interface screen, receiving a request for subscribing to a specific channel that has published the recommendation board, from a user, and transmitting information on a channel for which a subscription is requested to the application server and requesting registering as a subscription channel Each board displayed on the interface screen is a content distribution unit that is composed of a board title and a plurality of contents, and is exposed along with a name of a channel having published a corresponding board. The channel publishing each board is an account that has subscribed to a service providing the instant messaging application.

The interface screen may include a first tab screen for exposing the recommendation boards, and a second tab screen for exposing boards recently published in the subscription channel Here, the second tab screen may display a board recently published in each subscription channel on a slot of the corresponding subscription channel.

The interface screen may expose a creation board including contents curated by a creator, and a data board that is collected and edited by an algorithm.

An arbitrary board displayed on the interface screen may include an interaction area including a function implemented as an action button in a certain area of a corresponding board.

Receiving the request for subscribing to the specific channel may include receiving an input of adding a friend for the channel.

According to another embodiment, a method for publishing a board through interworking with a creator center server by a terminal is provided. The method includes displaying an editor screen of a creation channel, provided by the creator center server, displaying interworking services that are content sources on the editor screen, and adding a content selected from the interworking services as a content of a board, receiving board creation information including added contents from the editor screen, and requesting to the creator center server for publishing a board created based on the board creation information, The board is a content distribution unit that is composed of a board title and a plurality of contents, and is exposed with being expressed as being published in the creation channel.

The method may further includes displaying an input window for inputting an address link (URL) on the editor screen, and adding a content corresponding to the address link input into the input window, as a content of the board.

The method may further include displaying boards published in the editor screen, and adding a content selected from the published boards as a content of the board.

The board creation information may further include a function set for the board and setting information of the function, and the function may be implemented as an action button displayed on a certain area of the board.

The method may further include displaying at least one function settable for the board on the editor screen, and providing a setting screen for inputting setting information about a selected function.

According to still another embodiment, a method for publishing a board through interworking with a creator terminal by a creator center server is provided. The method includes providing the creator terminal with an editor screen for creating a board of a creation channel, and creating a board based on board creation information input on the editor screen, and publishing the board based on board publication setting information input on the editor screen. The editor screen includes a first screen for receiving the board creation information, and the first screen includes an area for receiving a board title and a content area for receiving contents to be loaded on a board. The editor screen includes a second screen for receiving the board publication setting information, and the second screen includes an area for receiving a disclosure setting of a board, a publication time point of a board, and a category of a board.

The editor screen may display interworking services that are content sources, and add a content selected from the interworking services to the content area.

The editor screen may display an input window for inputting an address link (URL) and add a content corresponding to the address link input on the input window to the content area.

The first screen may further include a board function area for receiving a selection of at least one function settable for a board, and may further provide a setting screen for inputting setting information of a selected function.

Publishing the board may include assigning a board identifier to the board and publishing the board having the board identifier and an identifier of the creation channel.

According to an embodiment, any user who has a channel in an application can become a creator. Further, through boards curated with various perspectives of creators, an activation of subscription, a continuous maintenance of subscription, and an increase in content consumption can be expected.

According to an embodiment, through an editor provided by a creator center server, a creator can interwork with various content sources, can load a board being a content distribution unit by curating contents fetched from the interworking service and contents fetched by inputting an address link, and can publish the board to expose the board to a subscriber/potential subscriber.

According to an embodiment, a user can search for recommendation boards through a discovery tab, and can search for recently published boards in a subscription channel added as a friend through a subscription tab.

According to an embodiment, it is possible to expose contents as a board unit consisting of contents grouped by one topic (board title), and to enable a content curated by a creator to be completely consumed.

BRIEF DESCRIPTION OF THE DRAWINGS

FIG. 5, FIG. 6, and FIG. 7 are examples of an editor screen displayed on a creator terminal.

DETAILED DESCRIPTION OF THE EMBODIMENTS

Figure 1:
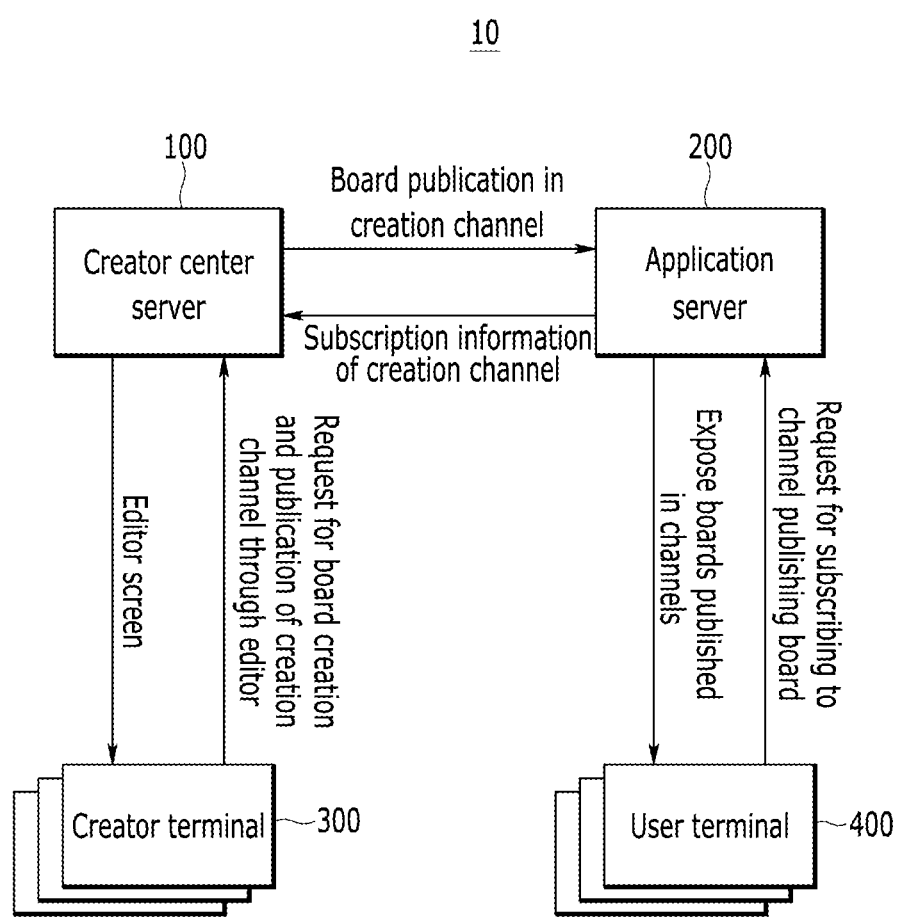
FIG. 1 is a configuration diagram of a subscription system according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and descriptions are to be regarded as illustrative in nature and not restrictive. Like reference numerals designate like elements throughout the specification.

Throughout the specification, when a part is referred to "include" a certain constituent element, it means that it may further include other constituent elements rather than exclude other elements, unless specifically indicates otherwise. In the description, the terms such as " . . . unit", " . . . er/or", " . . . module", and the like refer to units that process at least one function or operation, which may be implemented with a hardware, a software, or a combination thereof.

A server may include at least one processor, a memory for loading a computer program executed by the processor, a storage device for storing a computer program and various data, and a communication interface. In addition, the server may further include various constituent elements. A processor is a device for controlling an operation of the server, and may be a processor of various types that processes instructions included in a computer program. For example, the processor may be a central processing unit (CPU), a micro processor unit (MPU), a micro controller unit (MCU), a graphic processing unit (GPU), or may be configured to include at least one of any type of processor well known in the art of the present disclosure. A memory stores various data, instructions and/or information. The memory may load a corresponding computer program from a storage device so that instructions described to execute an operation of the present disclosure are processed by the processor. The memory may be, for example, a read only memory (ROM), a random access memory (RAM), and the like. The storage device may non-temporarily store a computer program and various data. The storage device may include a hard disk, a removable disk, a non-volatile memory such as a read only memory (ROM), an erasable programmable ROM (EPROM), an electrically erasable programmable ROM (EEPROM), and a flash memory, or any type of computer readable recording medium well known in the art of the present disclosure. The communication interface may be a wired/wireless communication module supporting wired/wireless communication. The computer program includes instructions executed by a processor, and is stored on a non-transitory computer readable storage medium. The instructions make the processor to execute the operation of the present disclosure.

A terminal includes an application/program, being a software stored on a computer readable storage medium, and a hardware such as a processor, a memory, a display, and a communication module. The processor cooperates with hardware to run the application. The display may display a user interface screen provided by an application, and may receive user input, for example, may receive touch input. The communication module communicates with the server via a communication network. The terminal may be implemented in various forms. Though a mobile terminal is described as an example, the terminal may be implemented in a form of a tablet-type terminal such as a smart pad, various types of computers such as a laptop computer, a wearable device, a TV terminal, and the like.

The application is a software stored on a computer readable storage medium, and includes instructions and data for executing the performing an operation of the present disclosure. The application is installed on the terminal, is executed on the terminal, and communicates with a designated server via a communication network.

As will be described below, the application exposes a board composed of contents curated by a creator, provides a subscription service that supports subscribing to a channel by adding a channel having published a board as a friend, and displays an interface screen described in the present disclosure. The application may be an instant messaging application or an application interworking therewith. In the description, the application is described to be the instant messaging application. In the description, the terminal that executes an application and communicates with an application server is described as an operating entity.

In the description, it is assumed that the board is a space for exposing contents including a plurality of contents grouped by one subject (board title) and a unit of contents distribution, and a board published by a creator is exposed on a slot occupying a certain area on a screen.

The creator can publish and manage the board by curating contents through an editor displayed on the terminal. Since the creator publishes the board on one's own channel, the channel may be considered to be a publishing entity. The channel where the creator publishes the board is referred to as a creation channel, and a creation channel to which a user subscribes is referred to as a subscription channel. A user may subscribe to a creation channel in various ways, and subscribe to the corresponding channel by adding the channel as a friend. Here, the channel is an account that has subscribed to an instant messaging service providing an instant messaging application. A user who is recommended or subscribed to a board published in a channel is also a subscriber who has subscribed to an instant messaging service and can use the instant messaging application. When a channel is added as a friend in the instant messaging application, the channel becomes included in a friend list, thereby subscribing to the corresponding channel in such a friend-adding way. In particular, a user can send or receive a message via a chat room with a channel opened in the instant messaging application.

Figure 2:
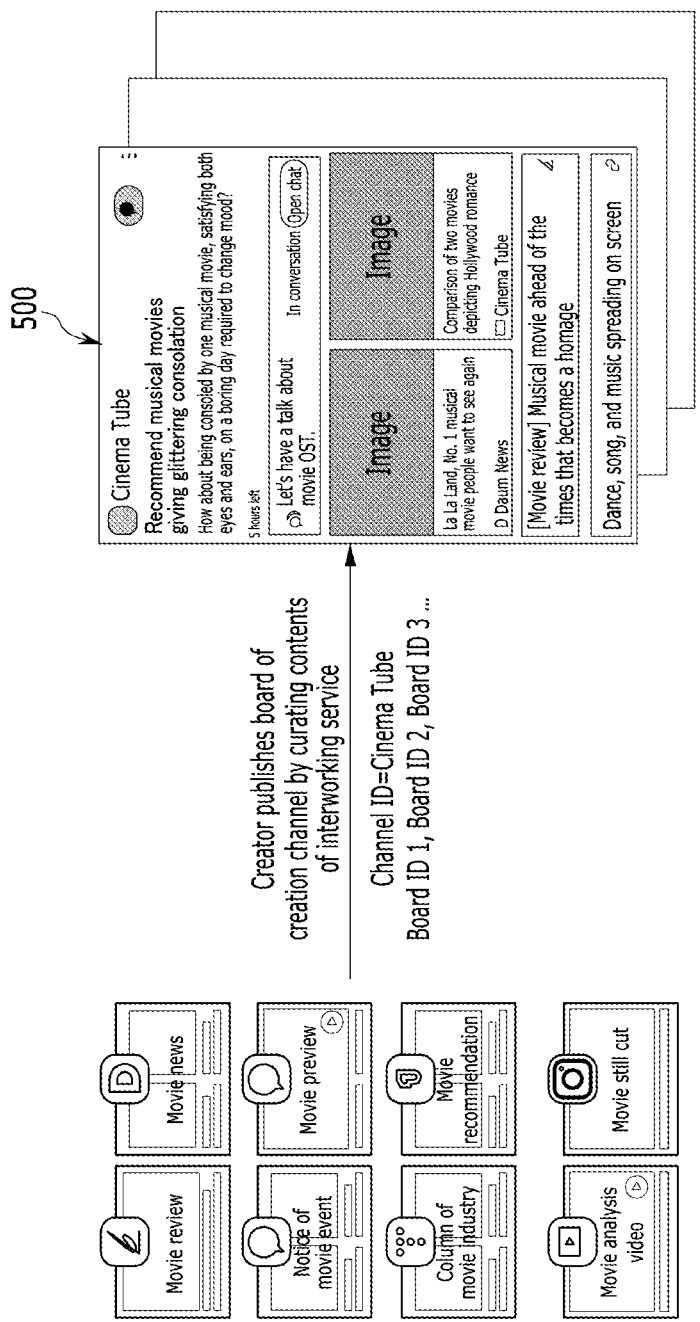
FIG. 2 is a diagram illustrating a board created from various content sources according to an embodiment.
Figure 3:
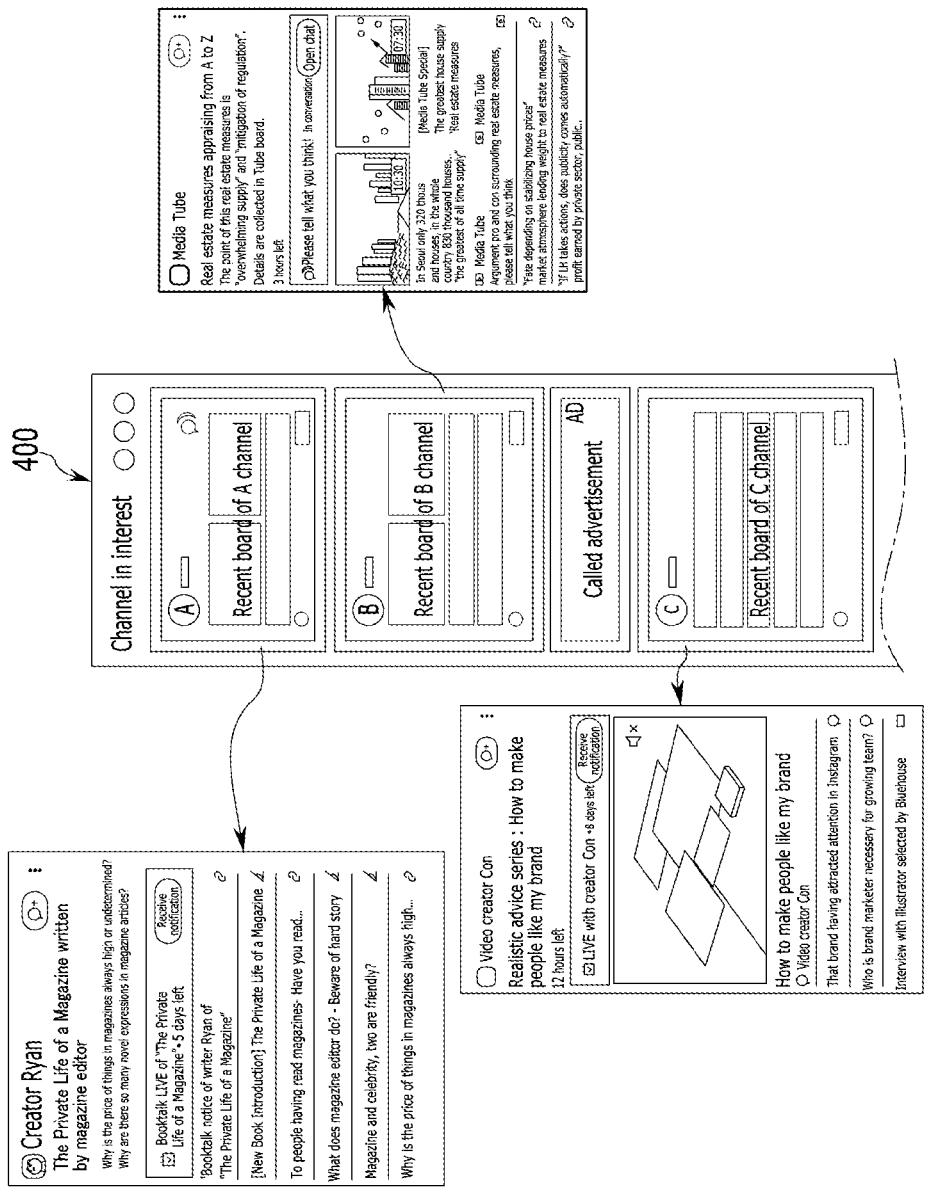
FIG. 3 is an exemplary diagram of an interface screen on which boards are exposed according to an embodiment.

FIG. 1 is a configuration diagram of a subscription system according to an embodiment, FIG. 2 is a diagram illustrating a board created from various content sources according to an embodiment, and FIG. 3 is an exemplary diagram of an interface screen on which boards are exposed according to an embodiment.

Referring to FIG. 1, a subscription system 10 may include a creator center server 100, an application server 200 that exposes online a board published in the creator center server 100 and manages a subscription, a creator terminal 300 that accesses the creator center server 100, and publishes and manages a board, and a user terminal 400 which an application is installed on and interworks with the application server 200.

The creator center server 100 and the application server 200 interwork with each other to provide a subscription service. In the description, the creator center server 100 and the application server 200 are separately described, but a design of the server may be variously changed.

The application server 200 may provide other services implemented in the application in addition to the subscription service that exposes the published board and manages the subscription. In the description, the subscription service related to the present disclosure will be mainly described.

Meanwhile, the creator terminal 300 may also be a user terminal 400 that installs an application and interworks with the application server 200 like the user terminal 400. However, for convenience, a creator who creates a board and a user (subscriber) who browses a board curated by the creator are described separately.

The creator center server 100 provides the creator terminal 300 with an editor screen on which a board can be created by curating produced contents and/or collected contents, can be published in a creation channel, and can be managed through change/deletion and the like.

The creator terminal 300 may display an editor screen, and transmit, to the creator center server 100, a request for board creation and publication, board management information, and the like. The creator center server 100 may create and publish a board based on board creation information input from the creator terminal 300 via the editor screen. When a board is published, a board identifier (board ID) may be assigned. Meanwhile, the creator terminal 300 may be provided with the editor screen by executing an application, or be provided with the editor screen by executing a program (e.g., a browser) different from the application.

The creator center server 100 may interwork with various content sources and display a list of contents fetched from the content sources. The creator may create a board by curating contents and change the created board. Further, the creator can provide the board to the editor screen through which a publication of a board can be requested. The creator center server 100 can provide not only contents, but also the editor screen that enables the creator to implement, on the board, various functions (an open chat function, a schedule-related calendar function, a purchase function, a sponsorship function, and the like) supporting interactions with users on the board. Here, the open chat function means a function that provides a chat room in which participants can freely join an open chat regardless of whether they are related as friends in the instant messaging application. When the creator sets the open chat function on the board, an access link for the open chat room is created. If a user selects the access link on a published board, the corresponding open chat room can be displayed on the screen. Here, the access link for the open chat room may be implemented on an action button. The schedule-related calendar function is a function for registering a schedule predetermined by the creator in a calendar. If the creator sets the schedule-related calendar function on the board, the user can check the schedule set on the published board through the calendar. At this time, the schedule-related calendar function may provide a simple schedule for registering the schedule in the calendar, or may provide online participation or open chatting via a participation link or an open chat link. Here, the calendar may be provided by the instant messaging application. When the creator sets a purchase function on the board, an interworking link with an interface providing a product introduction and product purchase is generated. Then, the user can use the purchase function via the interface screen provided by the interworking link implemented on the action button of the published board. When the creator sets the sponsorship function on the board, an interworking link with an interface for providing sponsorship is generated. Then, the user can use the sponsorship function via the interface screen provided by the interworking link implemented on the action button. In addition, when the creator sets various functions on the board, links interworking with interfaces for providing the corresponding functions are generated. The user can use the corresponding function via the links implemented on the action button of the published board.

Referring to FIG. 2, a creator puts to keep linkages with interworking services through which contents can be selected on an editor screen provided through a creator terminal 300. For example, the interworking services may be Brunch, Kakao TV, Tistory, Daum News, YouTube, Instagram, and the like. Thereafter, the creator may select contents corresponding to a subject (e.g., recommendation of musical films giving glittering consolation) from the interworking services, and may create and publish a board 500 curated with contents in accord with the subject. The creator may include a content that can be specified by an address link (URL) as well as content fetched from the interworking service in the board 500. Additionally, the creator can load a published board and add a content included in the loaded board to a new board.

The published board 500 is a content distribution unit including a plurality of contents grouped by one subject (board title), and may have a unique board identifier (board ID) and a channel identifier (channel ID) in which the board is published.

When the creator owns or manages multiple channels, a specific channel (e.g., Cinema Tube) in which a board is to be published may be set as a creation channel among the multiple channels, and the board may be published on the creation channel.

The creator can write a board title and board description (option) on the editor screen, and generate and publish a board by selecting contents. The creator can publish the board by setting a disclosure setting of the board, a publication time point (present or scheduled), a category of the board, and whether to show a board guidance message of reward, and the like.

Meanwhile, on the editor screen provided through the creator terminal 300, the creator may set a function to be provided in the board. The set function may be expressed as, for example, an action button providing a function (e.g., open chat button), a function description (e.g., "Let's talk about a movie OST."), and function state (e.g., in conversation), in some area of the board 500. Here, the action button is a UI component programmed to perform an operation corresponding to a button name when selected. The button name may be variously changed. When a user navigates the board 500 via a user terminal 400 and selects an action button (e.g., open chat button), the user terminal 400 may display an open chat room linked to the function (open chat) set on the action button. If the action button provides a schedule notification function, the user terminal 400 may display a calendar for setting a schedule notification or register a corresponding schedule in a schedule notification bot.

As the function, for example, an open chat function, a schedule-related calendar function, a purchase function, a sponsorship function, and the like may be implemented. As the function, a single function may be implemented or multiple functions may be implemented in combination. On the other hand, the function implemented in the action button may be changed stepwise according to the passage of time or a user's selection. In addition, the function state may also be changed (e.g., 2 days ago, 1 day ago, in conversation, etc.) according to the passage of time or a user's selection. For example, if a user who received a recommendation for the board 500 selects an action button, "Receive notification button", for notifying an open chat schedule before open chat starts, the action button displays a state, "In receiving notification) until the open chat, being a next function, starts. Then, when it becomes a time point of the open chat schedule, the action button can be changed to an action button, "Open chat button", that implements a function that enables a user to select (e.g., click) to join the open chat room. When the open chat schedule ends, the action button may display a state, "Open chat is terminated", be deactivated, or be removed from the board.

Referring to FIG. 1 again, the creator center server 100 assigns a board identifier to the board created in the creator terminal 300 and publishes the board. The published board may be stored on a database accessible by the application server 200, or may be stored on a database managed by the application server 200. In the description, it can be described that the creator center server 100 transmits the published board to the application server 200. The creator center server 100 may generate a unique board identifier (board ID), and transmit, to the application server 200, the channel identifier (channel ID) where the board is published, the board identifier, and contents of the board. In this case, the creator center server 100 may transmit, to the application server 200, setting information of board publication, such as a disclosure setting of the board, a publication time point (present or scheduled), a category of the board, and whether to expose a board guidance message of reward.

In addition, the creator center server 100 may transmit board information changed/deleted in the creator terminal 300 to the application server 200.

The application server 200 may provide the user terminal 400 with recommendation boards selected from the boards published in the creator center server 100, and may also exposes the boards of the subscription channel on the user terminal 400. The application server 200 may disclose or close the board according to the setting information of board publication, may expose the board at the publication time point, and may recommend the board to users based on the category of the board.

The application server 200 may manage the board identifier and the identifier of a channel in which the board is published, and may manage an exposure condition set for each user for a channel or board (e.g., whether each user subscribed to the channel, whether each user sets to "display this channel less", and the like). The application server 200 may or may not expose the corresponding board to the user terminal 400 according to the exposure condition set for the channel or board.

The application server 200 may expose recommendation boards through a discovery tab displayed on the user terminal 400, and may expose boards recently published in a subscription channel through a subscription tab distinct from the discovery tab. Here, the recommendation boards may not include a board published in the subscription channel.

The application server 200 may recommend the board to the user, based on at least one of interests preset by the user, behavior information of the user (inquiry, subscription, recommendation, purchase, etc.), personal information of the user (gender, age, residence, or occupation, etc.). unless specifically indicates otherwise. The application server 200 may use the behavior information of the user that is collected from an instant messaging application, and/or web or an application interworking with the instant messaging application. The user terminal 400 may receive an input of a subscription request for a channel that has published the recommendation board from the user, and may request to register as the subscription channel of the user by transmitting information on the subscription-requested channel to the application server 200. The user may make a subscription request in a way of adding a channel as a friend in the instant messaging application. When the user adds a channel as a friend in the instant messaging application, the channel becomes to be included in a friend list, thereby being able to subscribe to the corresponding channel in such a way of adding a friend.

Thereafter, the user terminal 400 may expose the boards published in the subscription channel on the subscription tab. The application server 200 may provide subscription information of each creation channel to the creator center server 100.

Meanwhile, the user terminal 400 may receive a subscription cancellation request for a subscription channel from the user, and may request to release the user from the subscription channel by transmitting information about the channel for which the subscription cancellation is requested to the application server 200. Thereafter, the user can search for boards published in the subscription cancellation channel in the search tab. The method for cancelling subscription of a channel may be various. After a user has subscribed to a channel through adding a friend in the instant messaging application, the user can request to cancel the subscription to the channel while maintaining a friend relationship. Alternatively, after the user has subscribed to a channel through adding a friend in the instant messaging application, the user may request to cancel the subscription to the channel by blocking the friend or deleting the friend.

Referring to FIG. 3, a user terminal 400 may expose boards recently published in a subscription channel via a subscription tab. The boards that was published recently in the channel (subscription channel) added as a friend by a user may be exposed on a screen provided by the subscription tab. An exposure order of the boards may be set by the user, or may be set in various ways, such as in a publication date order and in a subscription date order. When a certain channel is subscribed (added as a friend), the user terminal 400 may expose a recent board of the corresponding channel in a slot of the subscription channel.

Meanwhile, the user terminal 400 may expose recommendation boards recommended by the application server 200 via a discovery tab.

Hereinafter, an interface screen that is provided to a creator terminal 300 by a creator center server 100 and displayed on the creator terminal 300, and an interface screen that is provided to a user terminal 400 by the application server 200 and displayed on the user terminal 400 will be described in detail.

Figure 4:
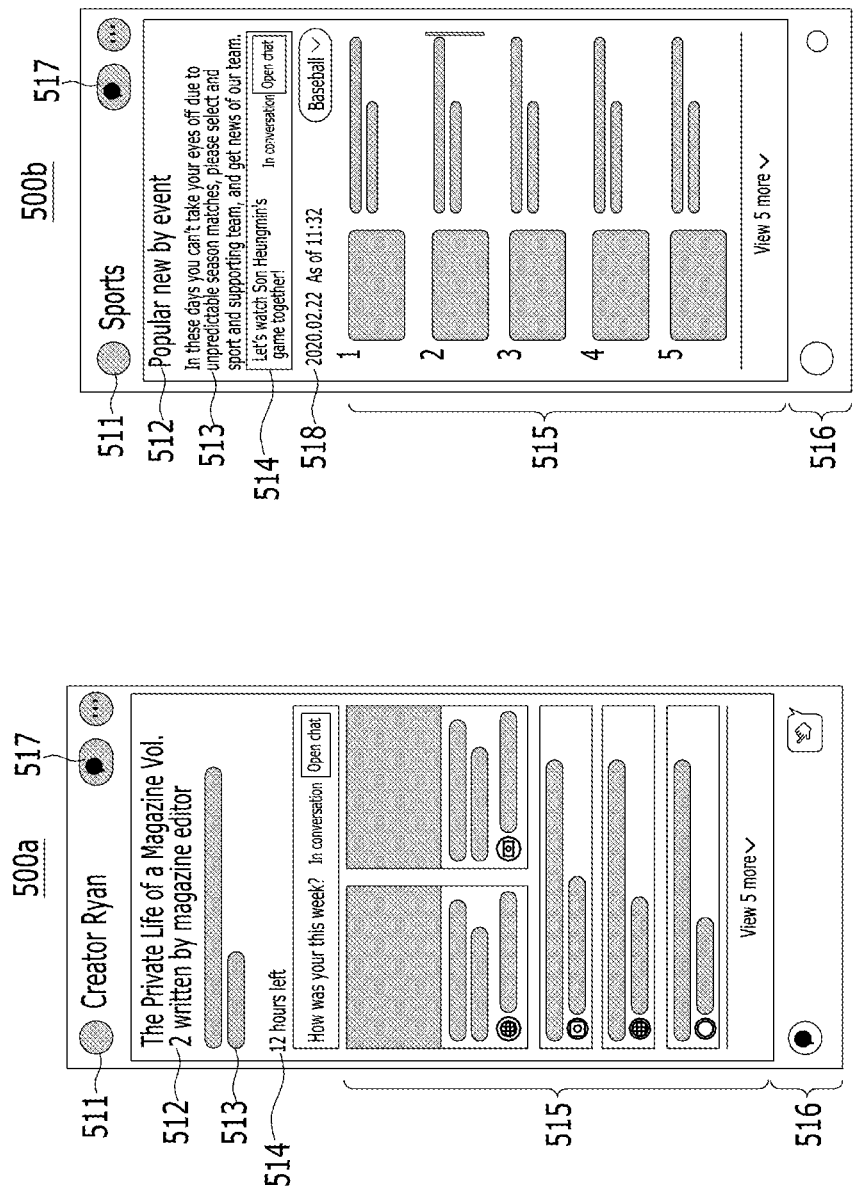
FIG. 4 is a diagram illustrating a board configuration according to an embodiment.

FIG. 4 is a diagram illustrating a board configuration according to an embodiment.

Referring to FIG. 4, a board may have various types.

The board 500a is a type of a creation board that is freely published in a channel having a general authority, and may be published in a creator center server 100. Namely, through an editor provided by a creator center server 100, a creator can publish a board 500a by curating contents obtained from various content sources.

The board 500a may be composed of areas of a creation channel name 511, a board title 512, a board description 513, an interaction area providing a function 514, and arranged contents 515. The board description 513 and the interaction area 514 may be selectively included by the creator, and an arrangement of the contents 515 may follow a template selected by the creator.

The exposed board 500a may be exposed including a user response area 516 that can receive sharing and/or a reaction of a user. The user can share a board in a chat room and the like via a designated button in the user response area 516. The user can input a reaction for a board through the designated button in the user response area 516. The reaction method that can be input may be various. For example, sending a message, clicking a recommendation, giving a gift, sponsoring, and the like may be provided.

The exposed board 500a may include a button 517 through which a user can subscribe to a channel (add a friend). The board 500a may display a time point of board publication, and the time point of board publication may be a criterion for determining whether to be the recent board.

An application server 200 may publish a board 500b of data board type composed of various collected data such as news article. The board 500b of data board type may be published by the application server 200 without going through the creator center server 100.

The board 500b may be a data board that is published based on an exposure condition, such as recent data, popular data, recommended data, and binge-reading data, after collecting related data through an API linkage in a virtual account channel of an instant messaging service (e.g., a sports news channel, an entertainment news channel, a media news channel, a multimedia channel, a broadcasting station channel, broadcast program channel, etc.). That is, the data board may be composed of contents collected and edited by a kind of algorithm and may include timely public interests. Meanwhile, a channel having a special authority is not limited to publish only a data board, but may be used as a channel publishing a creation board.

The board 500a may be composed of areas of the creation channel name 511, the board title 512, the board description 513, the interaction area, and arranged contents 515. The board description 513 and the interaction area 514 may be selectively included, and the arrangement of the contents 515 may follow a template designated to the data board type.

The exposed board 500b also be exposed with including the user response area 516, and may include a button 517 enabling a user to subscribe to a channel (add a friend). The board 500b may display the time point of board publication which may be a time point of data update.

The data board such as the board 500b may be published through an API linkage development, and may be periodically updated according to an API policy while maintaining a board identifier.

The interaction area 514 may display an action button providing a function, a function description, and a function state. The action button may be selected (e.g., clicked), and a button name (e.g., receive notification, open chat, join, purchase, sponsor, etc.) may be displayed.

Here, the action button is a UI component programmed to perform an operation corresponding to the button name when selected, and the button name may be variously changed. A function provided through the action button may be changed stepwise according to the passage of time or a user's selection. Also, the function state also may be changed (e.g., 2 days ago, 1 day ago, in conversation, etc.) according to the passage of time or the user's selection.

Figure 5:
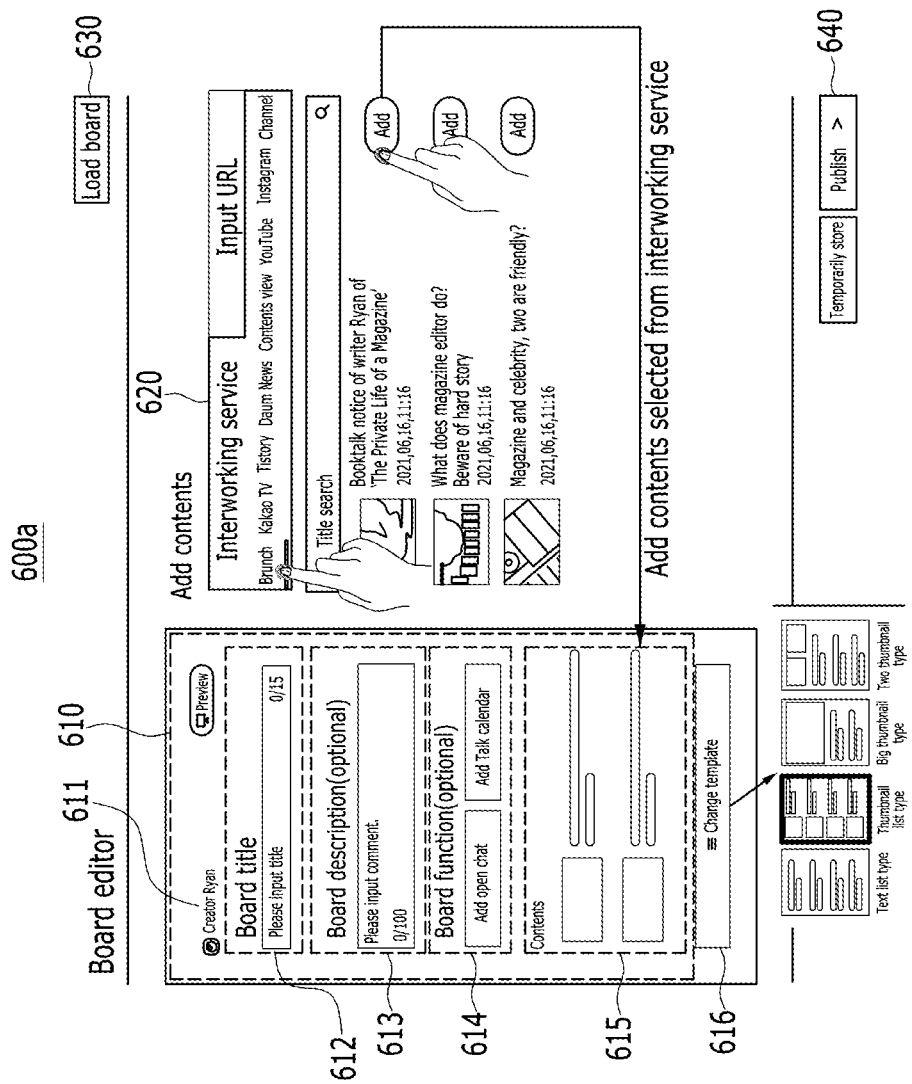
Figure 6:
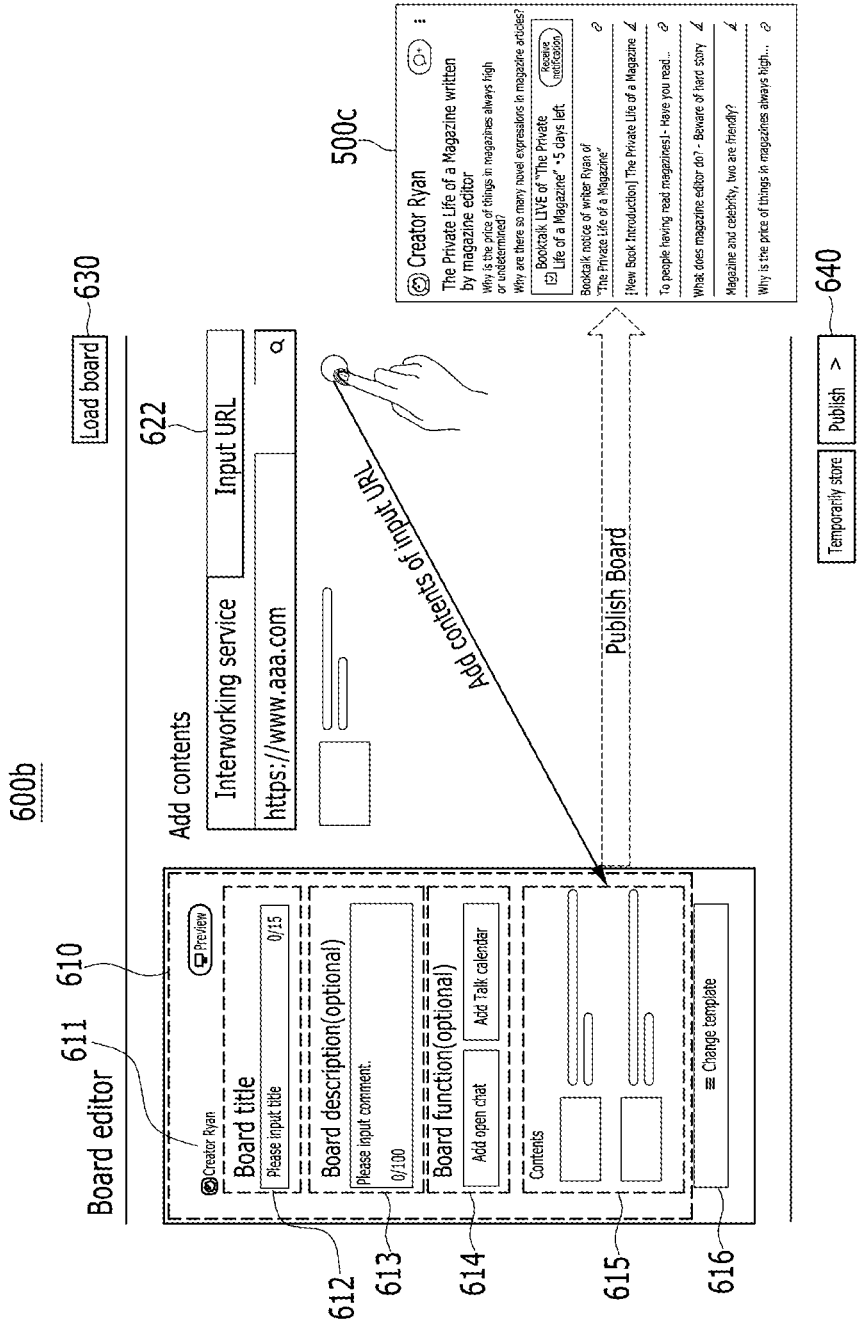

FIG. 5 to FIG. 7 are examples of an editor screen displayed on a creator terminal.

Referring to from FIG. 5 to FIG. 7, a creator center server 100 provides a creator terminal 300 with an editor (board editor) that can create and publish a board. A creator center server 100 can provide an editor screen fir for a type of the creator terminal 300. In the description, a PC screen is described as an example and may be provided as a mobile screen.

First, referring to FIG. 5, a creator terminal 300 displays an editor (board editor) screen 600a where a board can be created and published. It is assumed that the creator terminal 300 displays the editor screen 600a where a board can be published in a channel of creator Ryan.

The editor screen 600a displays a board creation area 610 through which information constituting the board can be input. The board creation area 610 may display a channel name 611, being a publishing entity, and may display a board title area 612, a board description area 613, a board function area 614, and a content area 615 that are inputtable areas. Here, the board description area 613 and the board function area 614 may be selectively input. The board function area 614 displays functions that can be provided by the board (e.g., an open chat function, a schedule-related calendar function, a purchase function, a sponsorship function, etc.). When the creator selects a desired function in the board function area 614, the editor screen 600*a* can provide a function setting screen through which a description corresponding to the function, an activation time point, an activation period, and the like may be set, and can set and display the function based on the input information. For example, when a creator selects the open chat function, a chat room name (e.g., "Booktalk LIVE of The Private Life of a Magazine"), an activation time point of an open chat room (e.g., immediately after publication or scheduled), and an activation period (e.g., 2 hours) may be set on the setting screen.

The editor screen 600*a* may display a template change button 616 for setting a template of the content area 615. Contents of the content area 615 are arranged according to the template selected by the creator.

The contents included in the content area 615 can be fetched from interworking services or can be fetched through inputting an address link (URL). The interworking services are content sources that are linked to fetch contents, and may include various services such as Brunch, Kakao TV, Tistory, Daum News, YouTube, and Instagram. The services may be registered as the interworking services by the creator in advance.

The editor screen 600*a* displays a interworking service area 620 where a content can be selected. Through the interworking service, a creator can select an article or image made by himself/herself as the content of the board, and can select an article or image made by others as the content of the board. At this time, a source of the content is indicated on the published board. The interworking services displayed in the interworking service area 620, such as Brunch, Kakao TV, Tistory, Daum News, YouTube, and Instagram, can be set to be linked by the creator in advance.

The editor screen 600*a* may display a board load button 630. The creator can fetch the created board by selecting the board load button 630, and then can add a content included in the fetched board to a new board.

The editor screen 600*a* may display a publication button 640.

Referring to FIG. 6, an editor screen 600*b* can display a URL input area 622 where a content of an address link can be added to a content area 615. The content of the address link (URL) input to the URL input area 622 may be added to a board.

A creator can check and modify a created board 500*c* through preview.

When all mandatory information is input in the board creation area 610 and then a publication button 640 is input, a board 500*c* can be published. At this time, when the publication button 640 is input, a board publication setting screen is provided, and a board may be published based on information input in the board publication setting screen.

Referring to FIG. 7, a board publication setting screen 600*c* may display a screen for inputting publication settings, such as a disclosure setting of a board, a publication time point (the present or scheduled), a category of a board, whether to expose a board guidance message of reward.

When a publication button is selected on the board publication setting screen 600*c*, a creator terminal 300 requests to publish a board based on information input onto the board creation area 610 from a creator center server 100. The creator center server 100 assigns a board identifier to the board requested to be published, and then publishes the board. The creator center server 100 may transmit, to an application server 200, a channel identifier in which the board is published, the board identifier, contents of the board, and board publication setting information.

Through such an editor, the creator can generate and change a board by curating contents from various content sources, can publish the board, and can conveniently implement various functions supporting interactions with users on the board.

Figure 8:
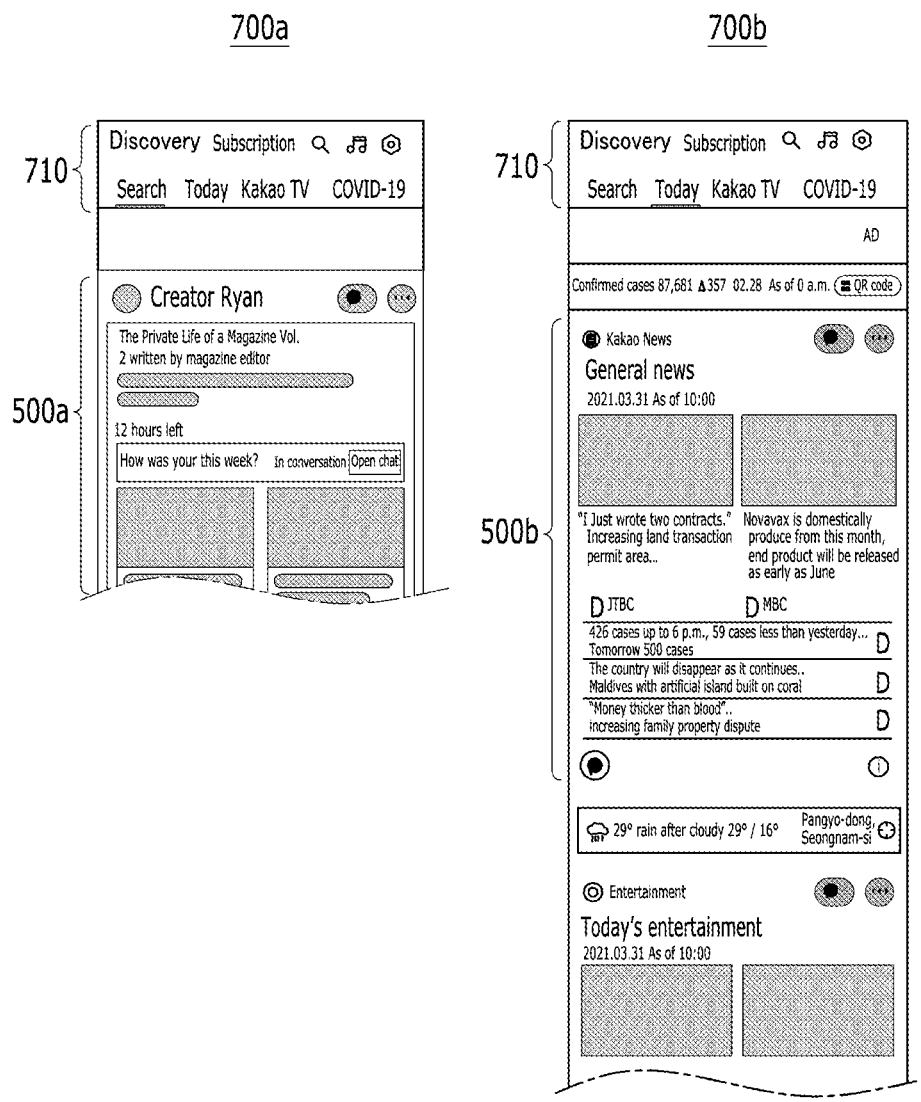
FIG. 8, FIG. 9, and FIG. 10 are examples of an editor screen displayed on a creator terminal.
Figure 9:
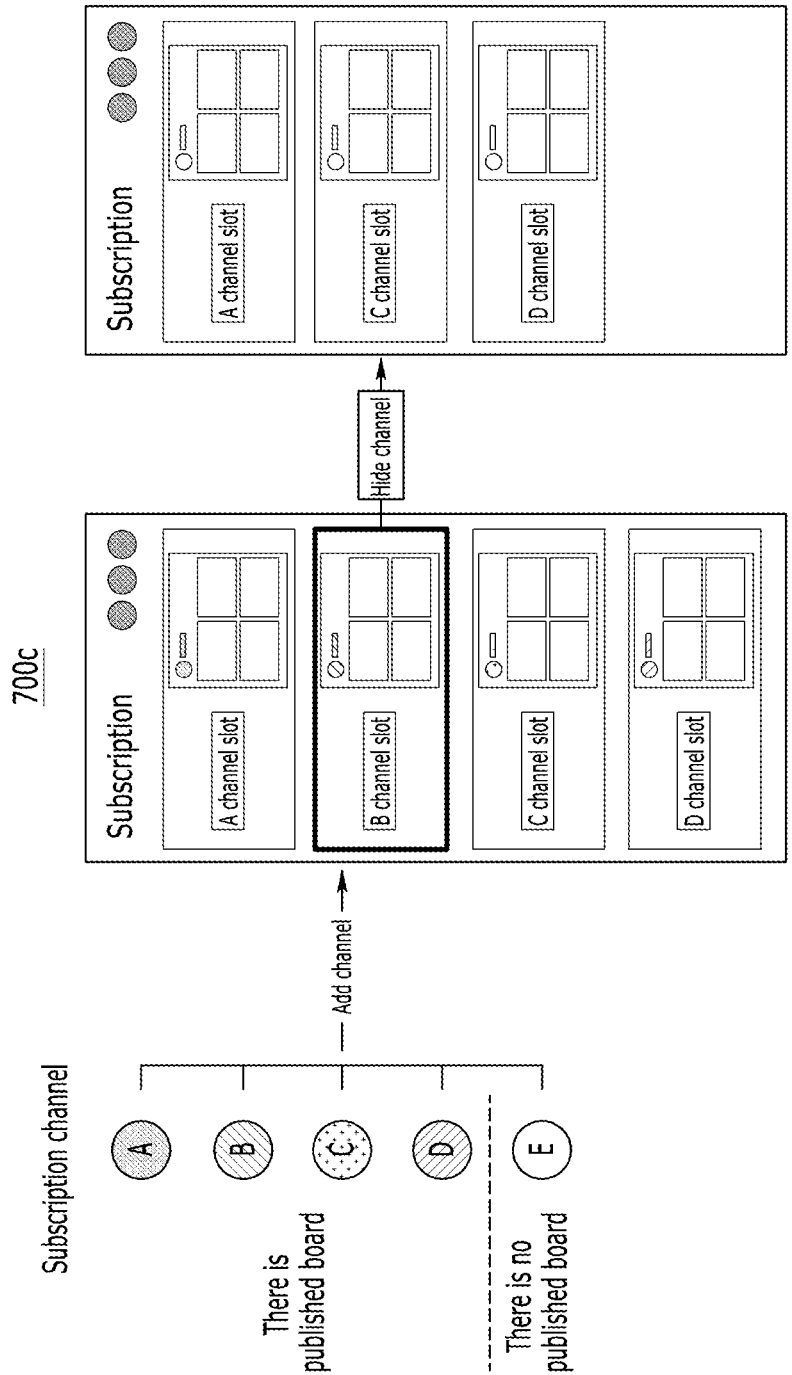
Figure 10:
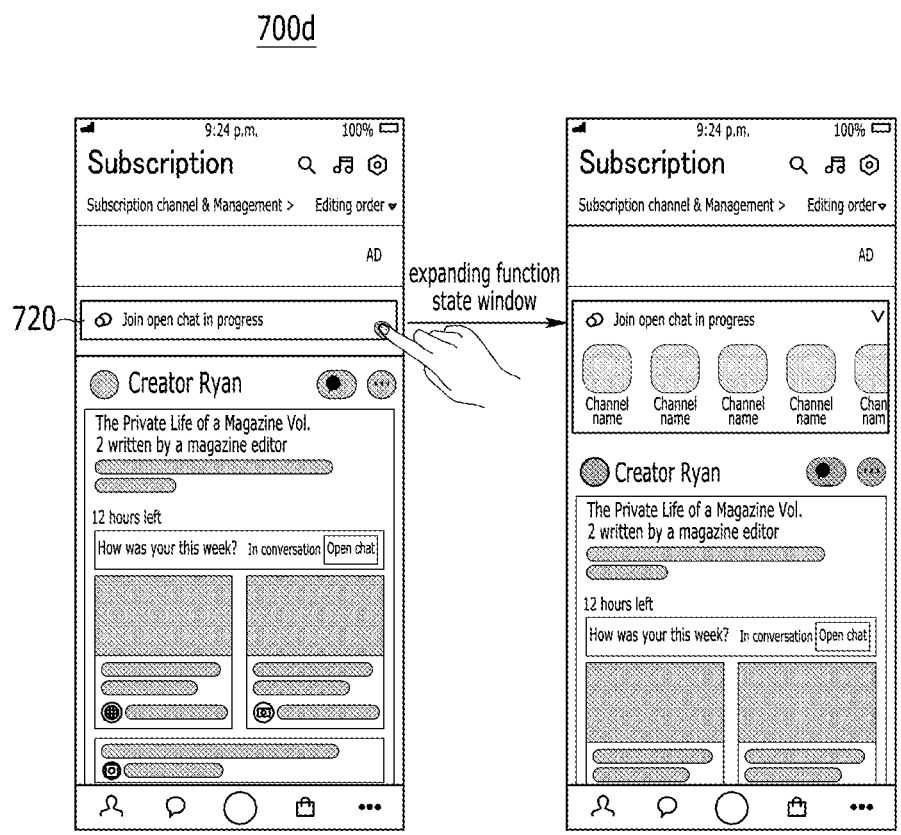

FIG. 8 to FIG. 10 are examples of an interface screen displayed on a user terminal.

Referring to from FIG. 8 to FIG. 10, an application server 200 may provide a user terminal 400 with recommendation boards selected among the boards published in a creator center server 100, and may also expose boards of a subscription channel to the user terminal 400.

The user terminal 400 may display a tab area 710 including a discovery tab exposing the recommendation boards and a subscription tab exposing boards recently published in the subscription channel.

Referring to FIG. 8, screens 700*a* and 700*b* of the user terminal 400 may display a discovery tab that may be composed of various sub-tabs. For example, the discovery tab may be composed of a search tab, a today tab, a multimedia tab (e.g., Kakao TV), a timeliness tab (e.g. Corona 19), and the like. Here, a configuration and order of the sub-tabs may be changed. The search tab screen 700*a* may display recommendation boards for a user, including a board 500*a* published on a specific channel (e.g., creator Ryan channel). At this time, the search tab screen 700*a* may display boards published in a non-subscription channel and a subscription channel. The search tab screen 700*a* may display not only a board of a created board type but also a board of a data board type. Meanwhile, the search tab screen 700*a* may display a card-typed recommendation card that recommends contents that are collected from not only a board of a single channel but also boards of multiple channels. Further, the search tab screen 700*a* may lead to selecting a specific channel or a content displayed in the recommendation card, and to entering a board curated with the corresponding contents.

Through the search tab screen 700*a*, a user's interest-based recommendation board, popular board, and the like may be distributed.

In the search tab screen 700*a*, a user can discover a board published in the channel of creator Ryan and subscribe to the channel (add as a friend). Then, the boards published in the channel of creator Ryan can be exposed in the subscription tab.

A today tab screen 700*b* may be composed of contents collected and edited by an algorithm and may mainly display a data board 500*b* containing timely public interests. The today tab screen 700*b* may be personalized based on interests of a user.

Referring to FIG. 9, a screen 700*c* of the user terminal 400 may display a subscription tab that exposes boards recently published in a subscription channel.

The subscription tab screen 700*c* does not continuously expose a feed according to a scroll in order to make the user stay long, but, in order for the user to completely consume contents of the channel subscribed by the user, may feed a recent board published in the corresponding channel to a slot of the subscribed channel. In the subscription tab screen 700*c*, slots of the subscription channel may be arranged based on a setting, such as user editing order and an order of the recent board.

For example, if the subscription channels of a user are A channel, B channel, C channel, D channel, and E channel, and each of A channel, B channel, C channel, and D channel has a recent board, the subscription tab screen 700*c* can display one board for each of A channel, B channel, C channel, and D channels one by one.

When an exposure condition such as hiding a channel is set for B channel among the subscription channel by a user, the subscription tab screen 700*c* may display boards of A channel, C channel, and D channel without displaying a boards of B channel.

Referring to FIG. 10, a user can check a function of each board while scrolling boards published in interested channels and use the checked function. However, when a plurality of boards is exposed, it is possible to be unable to use the function.

To solve such a problem, a screen 700*d* of a user terminal 400 may display a function state window 720 including a function state notification message when a function (e.g., an open chat function) is included in boards published in a subscription channel. The function state window 720 may be displayed in a format of a banner at the top of the screen, but the position and method of display may be variously changed.

An application server 200 or a user terminal 400 checks whether a function (e.g., open chat function) is included in the boards displayed on the screen 700*d*. When one or more function is identified, the application server 200 or the user terminal 400 may display the function state window 720 that provides notification information with being grouped, for functions provided through a recent board in the channels. For example, the function state window 720 may display, for example, "Join open chat in progress", "Join open chat in progress on OO channel", "Join N open chats in progress", and the like.

When the function state window 720 is selected, the function state window 720 may be expanded (unfolded). The expanded function state window 720 may display channels providing the function (open chat). When the user selects a channel in the expanded function state window 720, the user terminal 400 may convert from the board of the selected channel to a screen providing a predetermined function. For example, if the user selects A channel in the expanded function state window 720, the user terminal 400 can enter an open chat room in progress in A channel.

Figure 11:
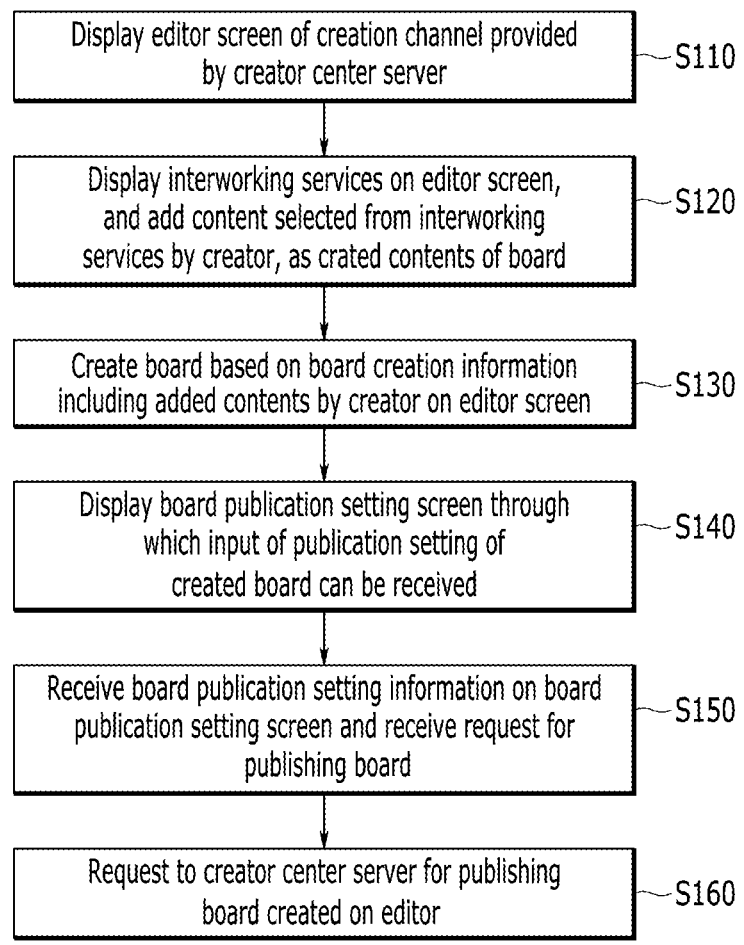
FIG. 11 is a flowchart showing a method for creating a board according to an embodiment.

FIG. 11 is a flowchart showing a method for creating a board according to an embodiment.

Referring to FIG. 11, a creator terminal 300 accesses a creator center server 100 and then displays an editor screen of a creation channel provided by the creator center server 100 (S110). The editor screen includes inputtable areas that can create a board to be published in a creation channel A board creation area that can receive information on areas constituting the board may display a name of a channel being a publishing entity, and may display the inputtable areas, such as a board title area, a board description area, a board function area, and a content area.

The creator terminal 300 displays interworking services, being the content sources, on the editor screen, and adds a content selected by the creator in the interworking services as the curated content of the board (S120). In addition, the creator terminal 300 may display an input window for inputting an address link (URL), and may add, as a content of the board, a content corresponding to the address link input into the input window. Further, the creator terminal 300 may display published boards and add a content selected by the creator from the published boards as the content of the board.

The creator terminal 300 creates the board based on board creation information including curated contents (S130). The board creation information may be a board title, a board description, a function set on the board, and curated contents. Here, the board description and the function may be optional information. The creator terminal 300 may display a function settable on the board by the creator, and may provide a setting screen on which a description corresponding to the function, an activation time point, an activation period and the like may be set. For example, an open chat function, a schedule-related calendar function, a purchase function, and the like may be implemented as the function. The function may be implemented as an action button, which may be displayed on the screen and selected. The function provided through the action button may be changed stepwise according to the passage of time and a selection of a user.

The creator terminal 300 displays a board publication setting screen through which an input of publication setting of a created board can be received (S140). The board publication setting screen may display a screen for inputting publication settings, such as a disclosure setting of a board, a publication time point (present or scheduled), a category of the board, and whether to expose a board guidance message for reward.

The creator terminal 300 receives the board publication setting information on the board publication setting screen and receives a request for publishing a board (S150).

The creator terminal 300 requests for publishing a board created in the editor screen to the creator center server 100 (S160). The board created by the creator terminal 300 may be published with being assigned a board identifier by the creator center server 100.

Thereafter, the creator terminal 300 may check the boards published in the creation channel, may update the board by modifying and editing, or may delete the board.

Figure 12:
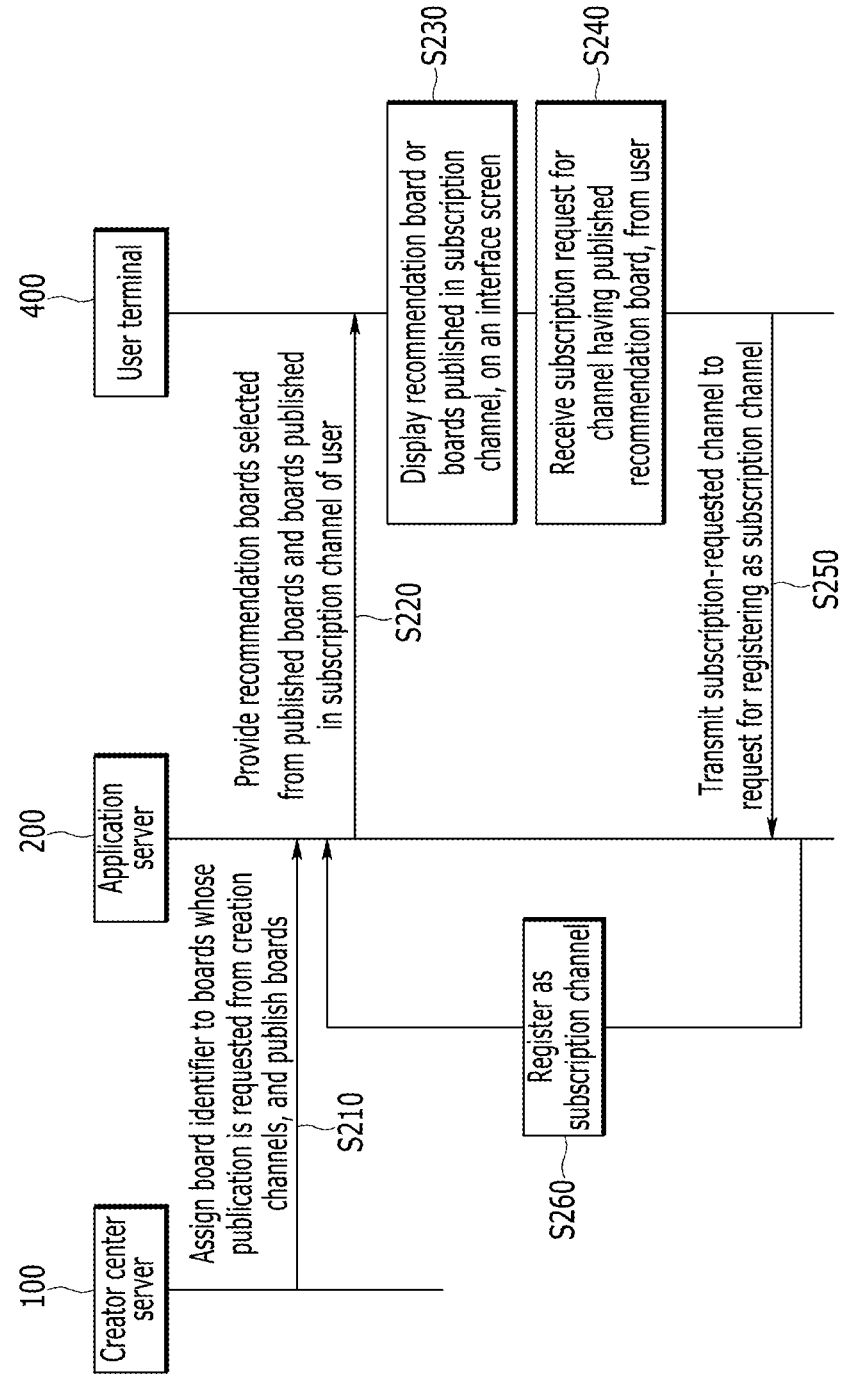
FIG. 12 is a flowchart showing a method for providing a subscription service according to an embodiment.

FIG. 12 is a flowchart showing a method for providing a subscription service according to an embodiment.

Referring to FIG. 12, a creator center server 100 assigns a board identifier to boards whose publication is requested from creation channels and publishes the boards (S210).

An application server 200 provides a user terminal 400 with recommendation boards selected from the boards published in the creator center server 100 and the boards published in a subscription channel of the user (S220). The application server 200 may provide the user terminal 400 with a data board composed of contents collected and edited by an algorithm.

The user terminal 400 displays the recommendation boards provided by the application server 200 or boards published in the subscription channel, on an interface screen (S230). The user terminal 400 may display an interface screen that is composed of a discovery tab screen exposing recommendation boards and a subscription tab screen exposing boards recently published in the subscription channel. The user terminal 400 may provide a discovery tab screen that may be composed of sub-tabs, such as a search tab, a today tab, a multimedia tab (e.g., Kakao TV), and a timeliness tab (e.g., COVID-19). The user terminal 400 may display a board recently published in the subscription channel on a slot of the corresponding subscription tab screen. The user terminal 400 can display various types of boards.

For example, a created board including contents curated by the creator, and the data board collected and edited by the algorithm may be exposed.

The user terminal 400 receives a subscription request for a channel that has published a recommendation board, from the user (S240). A user can request a subscription in a way of adding the channel as a friend.

The user terminal 400 transmits information on the subscription-requested channel to the application server 200 to request for registering as a subscription channel of the user (S250).

The application server 200 registers the channel for which a subscription is requested by the user terminal 400, as the subscription channel of the user (S260).

Thereafter, the user terminal 400 may expose the recent board of the corresponding channel on a slot of a new subscription channel.

As described above, according to an embodiment, any user who has a channel in an application can become a creator. Further, through boards curated with various perspectives of creators, an activation of subscription, a continuous maintenance of subscription, and an increase in content consumption can be expected.

According to an embodiment, through an editor provided by a creator center server, a creator can interwork with various content sources, can load a board being a content distribution unit by curating contents fetched from the interworking service and contents fetched by inputting an address link, and can publish the board to expose the board to a subscriber/potential subscriber.

According to an embodiment, a user can search for recommendation boards via a discovery tab, and can search for recently published boards in a subscription channel added as a friend through a subscription tab.

According to an embodiment, it is possible to expose contents as a board unit consisting of contents grouped by one topic (board title), and to enable a content curated by a creator to be completely consumed.

The embodiment of the present disclosure described above is not implemented only through the device and method, and a program for realizing a function corresponding to the configuration of the embodiment of the present disclosure or the program may be implemented through a recording medium in which the program is recorded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for providing a subscription service by a terminal installed with an instant messaging application, through interworking with an application server, the method comprising:
   displaying recommendation boards recommended by the application server on an interface screen;
   receiving a request for subscribing to a specific channel that has published a recommendation board selected from among the recommendation boards, from a user; and
   transmitting information on the specific channel to the application server and requesting registering the specific channel as a subscription channel; and
   displaying a board recently published in the subscription channel on the interface screen,
   wherein each board displayed on the interface screen is a content distribution unit that includes a plurality of contents curated for publishing, and is exposed along with a name of a channel publishing a corresponding board, and
   wherein the specific channel publishing the recommendation board is an account that has subscribed to a service providing the instant messaging application.

2. The method of claim 1, wherein the interface screen comprises a first tab screen for exposing the recommendation boards, and a second tab screen for exposing boards recently published in the subscription channel, and
   wherein the second tab screen displays the board recently published in each subscription channel on a slot of the corresponding subscription channel.

3. The method of claim 1, wherein the interface screen exposes a creation board including contents curated by a creator, and a data board that is collected and edited by an algorithm.

4. The method of claim 1, wherein an arbitrary board displayed on the interface screen comprises an interaction area including a function implemented as an action button in a certain area of a corresponding board.

5. The method of claim 1, wherein receiving the request for subscribing to the specific channel comprises adding the specific channel as a friend in the instant messaging application.

6. A method for publishing a board through interworking with a creator center server by a terminal, the method comprising:
   displaying an editor screen of a creation channel, provided by the creator center server;
   displaying interworking services that are content sources on the editor screen, and adding a content selected from the interworking services as a content of a board;
   receiving board creation information including added contents from the editor screen; and
   requesting to the creator center server for publishing a board created based on the board creation information,
   wherein the board is a content distribution unit that includes a plurality of contents curated for publishing, and is exposed with being expressed as being published in the creation channel, and
   wherein the creation channel is an account that has subscribed to a service providing the instant messaging application.

7. The method of claim 6, further comprising displaying an input window for inputting an address link (URL) on the editor screen, and adding a content corresponding to the address link input into the input window, as a content of the board.

8. The method of claim 6, further comprising displaying boards published in the editor screen, and adding a content selected from the published boards as a content of the board.

9. The method of claim 6, wherein the board creation information further comprises a function set for the board and setting information of the function, and wherein the function is implemented as an action button displayed on a certain area of the board.

10. The method of claim 9, further comprising displaying at least one function settable for the board on the editor screen, and providing a setting screen for inputting setting information about a selected function.

11. A method for publishing a board through interworking with a creator terminal by a creator center server, the method comprising:

providing the creator terminal with an editor screen for creating a board of a creation channel; and creating a board based on board creation information input on the editor screen, and publishing the board based on board publication setting information input on the editor screen, wherein the editor screen comprises a first screen for receiving the board creation information, and the first screen comprises an area for receiving a board title and a content area for receiving contents to be loaded on the board, wherein the editor screen comprises a second screen for receiving the board publication setting information, and the second screen comprises an area for receiving a disclosure setting of the board, a publication time point of a board, and a category of the board, wherein the board is a content distribution unit that includes a plurality of contents curated for publishing, and is exposed with being expressed as being published in the creation channel, and wherein the creation channel is an account that has subscribed to a service providing the instant messaging application.

12. The method of claim 11, wherein the editor screen displays interworking services that are content sources, and adds a content selected from the interworking services to the content area.

13. The method of claim 11, wherein the editor screen displays an input window for inputting an address link (URL) and adds a content corresponding to the address link input on the input window to the content area.

14. The method of claim 11, wherein the first screen further comprises a board function area for receiving a selection of at least one function settable for a board, and further provides a setting screen for inputting setting information of a selected function.

15. The method of claim 11, wherein publishing the board comprises assigning a board identifier to the board and publishing the board having the board identifier and an identifier of the creation channel.

16. The method of claim 5, wherein the specific channel is included as the friend in a friend list of the instant messaging application.

17. The method of claim 6, wherein the creation channel publishing the board is provided to a user as a subscription channel by adding, by the user, the creation channel as a friend in the instant messaging application.

18. The method of claim 11, wherein the creation channel publishing the board is provided to a user as a subscription channel by adding, by the user, the creation channel as a friend in the instant messaging application.

\* \* \* \* \*